(12) United States Patent
Okimoto et al.

(10) Patent No.: US 8,156,560 B2
(45) Date of Patent: Apr. 10, 2012

(54) METHOD AND APPARATUS FOR PROVIDING A BORDER GUARD BETWEEN SECURITY DOMAINS

(75) Inventors: John I. Okimoto, San Diego, CA (US); Bridget D. Kimball, Encinitas, CA (US); Annie O. Chen, Del Mar, CA (US); Michael T. Habrat, San Diego, CA (US); Douglas M. Petty, San Diego, CA (US); Eric Sprunk, Carlsbad, CA (US); Lawrence W. Tang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 829 days.

(21) Appl. No.: 11/027,206

(22) Filed: Dec. 30, 2004

(65) Prior Publication Data
US 2006/0150252 A1   Jul. 6, 2006

(51) Int. Cl.
*H04N 7/16* (2011.01)
(52) U.S. Cl. ......... 726/26; 726/5; 726/7; 726/8; 726/10; 726/14; 726/28; 726/30; 713/168; 713/170; 713/185; 709/217; 709/225; 709/227; 709/228; 709/248; 380/277; 380/278; 380/283; 348/E5.007; 348/E7.056
(58) Field of Classification Search ............... 726/26
See application file for complete search history.

(56) References Cited

U.S. PATENT DOCUMENTS

| 7,228,437 | B2 * | 6/2007 | Spagna et al. | 713/193 |
|---|---|---|---|---|
| 7,383,438 | B2 * | 6/2008 | Fahrny et al. | 713/169 |
| 7,669,225 | B2 * | 2/2010 | Peled et al. | 726/1 |
| 2002/0059425 | A1 * | 5/2002 | Belfiore et al. | 709/226 |
| 2002/0152173 | A1 * | 10/2002 | Rudd | 705/57 |
| 2003/0026432 | A1 * | 2/2003 | Woodward | 380/278 |
| 2003/0142818 | A1 * | 7/2003 | Raghunathan et al. | 380/1 |
| 2004/0103312 | A1 * | 5/2004 | Messerges et al. | 713/201 |
| 2004/0122743 | A1 * | 6/2004 | Hoke, Jr. | 705/26 |
| 2004/0204949 | A1 * | 10/2004 | Shaji et al. | 705/1 |
| 2004/0249768 | A1 * | 12/2004 | Kontio et al. | 705/65 |
| 2005/0071663 | A1 * | 3/2005 | Medvinsky et al. | 713/200 |
| 2005/0210261 | A1 * | 9/2005 | Kamperman et al. | 713/182 |
| 2006/0107326 | A1 * | 5/2006 | DeMartini et al. | 726/26 |
| 2006/0137015 | A1 * | 6/2006 | Fahrny et al. | 726/26 |
| 2006/0242069 | A1 * | 10/2006 | Peterka et al. | 705/50 |

OTHER PUBLICATIONS

Koenen, R., et al, 'The Long March to Interoperable Digital Rights Management ', 2004, IEEE, entire document, http://www.img.lx.it.pt/~fp/cav/Additional_material/Interoperable_DRM.pdf.*
PCT International Search Report, Dec. 22, 2005; Re: PCT Application #PCT/US05/46813.

* cited by examiner

*Primary Examiner* — Christian Laforgia
*Assistant Examiner* — Ronald Baum
(74) *Attorney, Agent, or Firm* — Stewart M. Wiener

(57) ABSTRACT

The present invention discloses an apparatus and method for defining and enforcing rules of transition between two security domains, e.g., a transport domain and a persistent security domain. In turn, a border guard, e.g., a security device, is provided between these two domains that enforce rules for transition between the two security domains. This novel approach of defining a transport domain and a persistent security domain simplifies the classification of the digital content and its movement through the system. Namely, the border guard once established between the two systems can enforce DRM rules associated with how contents are moved between the two domains.

15 Claims, 4 Drawing Sheets

METHOD AND APPARATUS FOR PROVIDING A BORDER GUARD BETWEEN SECURITY DOMAINS

BACKGROUND OF THE INVENTION

1. Field of the Invention

Embodiments of the present invention generally relate to digital rights management (DRM). More specifically, the present invention relates to a method and apparatus for defining and enforcing rules of transition between two security domains.

2. Description of the Related Art

Digital contents have gained wide acceptance in the public. Such contents include, but are not limited to: movies, videos, music and the like. As such, many consumers and businesses have digital media devices and/or systems that enable the reception of such digital multimedia contents via various communication channels, e.g., via a wireless link such as a satellite link or a wired link such as cable connections and/or telephony based connections such as DSL and the like.

Irrespective of the communication channels that are employed to receive the digital contents, owners of digital contents and the service providers (e.g., a cable service provider, a telecommunication service provider, a satellite-based service provider, merchants and the like) who provide such digital contents to subscribers or users are concerned with the protection of such digital contents. To illustrate, a service provider may receive a request from a user to download a movie for immediate viewing or to be stored on a storage device for later viewing. Certainly, the movie can be encrypted and forwarded electronically to the user. However, technologies related DRM usually only describes the control of the digital content once it is in the user's domain. The delivery of the content, and protecting it securely from the delivery (either broadcast or singlecast) to the end user and future management is often not addressed.

Thus, there is a need in the art for a method and apparatus for defining and enforcing rules of transition between two security domains.

SUMMARY OF THE INVENTION

In one embodiment, the present invention discloses an apparatus and method for defining and enforcing rules of transition between two security domains. For example, the present invention defines two distinct security domains, a transport security domain and a persistent security domain, where content is stored. In turn, a border guard, e.g., a security device, is provided between these two domains that enforce rules for transition between the two security domains. This novel approach of defining a transport security domain and a persistent security domain simplifies the classification of the digital content and its movement through the system. Namely, the border guard once established between the two systems can enforce DRM rules associated with how contents are moved between the two security domains.

In one embodiment, a portable renewable security card is optionally deployed to cooperatively operate with said border guard.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

In one embodiment of the present invention, Digital Rights Management (DRM) may specify one or more usage rules pertaining to digital contents (e.g., movies, videos, music, software applications and the like) that have been downloaded and stored locally by users, e.g., stored on a hard drive. The ability to allow a user to store and maintain persistent content in a personal video recorder (PVR) poses challenging security issues. The nature of security for persistent content is different from security for transport conditional access (CA). In other words, the rules that define whether a user is allowed to access the content will be different than the rules pertaining to the usage of the content once the user has gained access to the content. However, technologies related DRM usually only describes the control of the digital content once it is in the user's domain. In other words, rules in one domain are not carried to another security domain. Thus, the delivery of the content, and protecting it securely from the delivery (either broadcast or singlecast) to the end user and future management is often not addressed.

To address this criticality, the present invention provides two distinct security domains, a transport security domain and a persistent security domain. In turn, a border guard is provided between these two security domains that enforce rules for transition between the two security domains.

In one embodiment, the persistent security domain is referred to as a personal video recorder (PVR) security domain where video and movie are stored. This description of the persistent security domain is illustrative only. Namely, the present invention is not so limited, since many other contents such as audio data, software and the like can be protected in accordance with the present invention.

Figure 1:
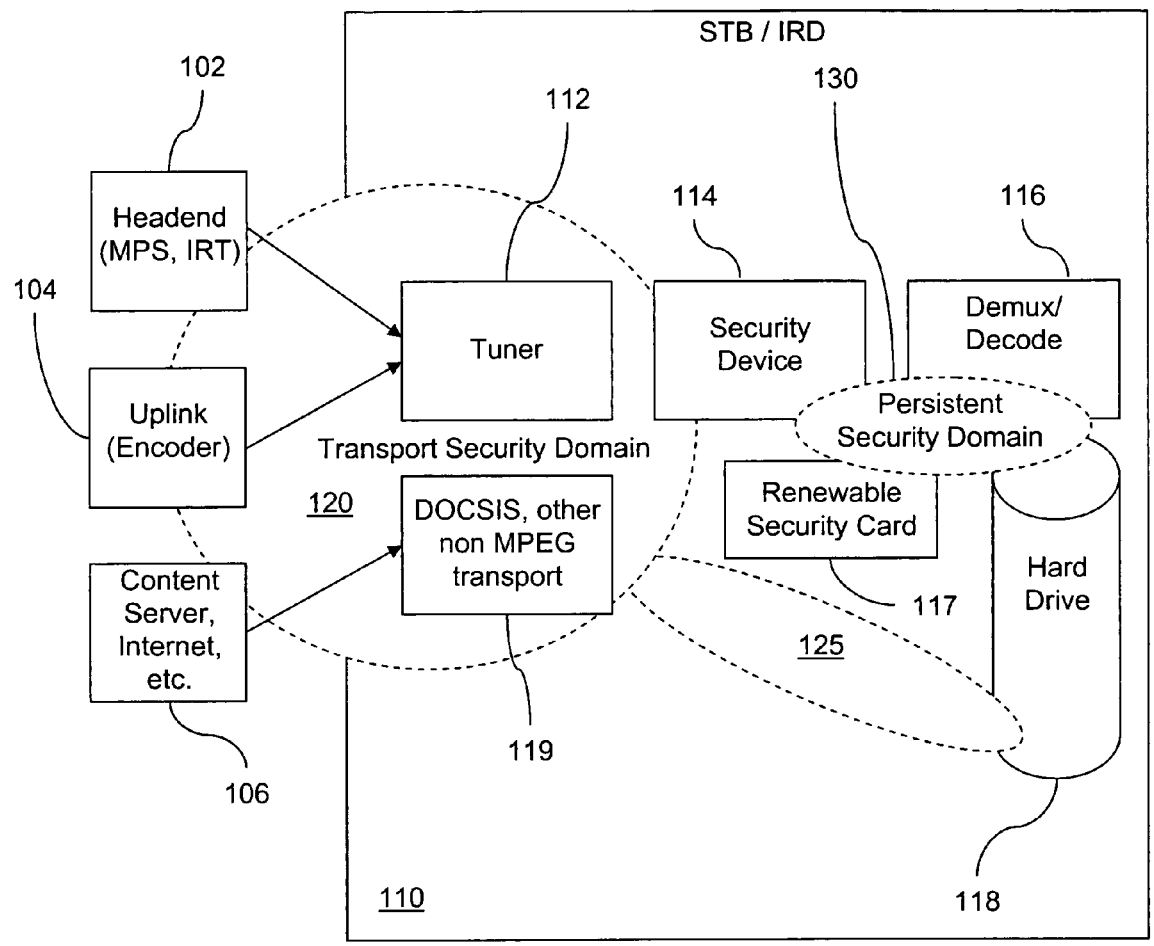
FIG. 1 illustrates a high level view of a content distribution system of the present invention.

FIG. 1 illustrates a high level view of a content distribution system 100 of the present invention. The system comprises a receiver device, e.g., a set top box or an integrated receiver/decoder 110 and a plurality of digital content sources, e.g., a headend 102 from a cable company, an uplink 104 from a satellite service provider, and a content server 106, e.g., via the Internet. In turn, the set top box or integrated receiver/decoder 110 comprises a tuner 112, a security device 114, a demultiplexer/decoder 116, an optional renewable security card 117, a hard drive 118, and a cable modem interface, e.g., a Data Over Cable Service Interface Specification (DOCSIS) module 119.

In one embodiment of the present invention, a transport security domain 120 and a persistent security domain 130 where content is stored, can be viewed as two separate security domains. For the delivery of a transport stream, e.g., an MPEG-2 transport or other multimedia/data (non-MPEG transport) to the STB/IRD 110, content is initially within the transport security domain 120. After decryption by the security device 114, e.g., implemented as an ASIC, the digital content moves into the persistent security domain 130, which addresses the protection of and access to the digital content inside the STB/IRD 110. In one embodiment, the security device 114 is involved in the entitlement verification in both the transport conditional access (CA) 120 domain and the persistent domain 130. This novel approach of defining a transport domain and a persistent security domain simplifies the classification of the digital content and its movement through the system. Namely, it is now possible to define rules of transition between the security domains, thereby allowing a border guard, e.g., the security device 114 to enforce the transition in a secure manner. In other words, the border guard once established between the two systems can enforce DRM rules associated with how contents are moved between the two domains. In one embodiment, the persistent security domain can be referred to as a personal video recorder (PVR)/ DRM security domain 130, where movie and video are stored.

A unique aspect of the present invention is that the DRM rules can be specified at the source of the content and are enforced by the border guard. In other words, contents owners are now able to define and control the DRM rules as the contents move through the security domains. In other words, the DRM rules are defined and sent with the digital contents, where the DRM rules are enforced from domain to domain. This protection accords great comfort to content owners who will have some assurance that the DRM rules that they defined will be carried out irrespective of which security domains that the digital content will reside, and will be preserved as content is transferred across security domains.

To illustrate, in the transport security domain, if all authorization criteria for a broadcast program are met as determined by the security device 114, the stream is decrypted and passed on for decoding. With the addition of DRM rules coupled with the content, the DRM rules will now also be delivered along with the content, and secured cryptographically with the encrypted content. For non-transport content (IP-based content, etc), the security device 114 provides the capability of bulk decrypt and encrypt. This content would also be delivered with conditional access and DRM rules, which the security device 114 would evaluate to determine if decryption, recordability, or playback is authorized.

For storage of the digital content on a hard disk drive 118, content security is implemented within the persistent security domain 130. For example, the content can be encrypted with the security device 114 using persistent security methods. It should be noted that the encryption used in the persistent security domain may be different than what is used in the transport security domain, and can be different across devices that are transferring the same content from the transport security domain to their individual instances of the persistent security domain. This approach allows content to be delivered in a broadcast manner in the transport security domain, but then is locally and uniquely encrypted in the persistent security domain, to make the content locked to one specific device, and not playable by other devices, unless some special key exchanges have occurred between the two devices.

Although the system 100 illustrates both security domains 120 and 130 sharing only one common access point via the security device 114, there is one exception to this approach. The transport security domain may optionally have access to the storage device 118 within the set top box/integrated receiver/decoder 110 via connection 125. This optional approach addresses the case of Impulse Pay-Per-View (IPPV) programming that is stored on the hard disk 118 without the user having purchased the programming. Namely, IPPV programming is representative of purchasable content (streaming, and the like) that is stored on the hard disk 118 for a future offering to the user.

This capability supports a business model of pre-positioning content on the user's hard drive 118, thereby offering features like Pay-Per-View and video on demand (VOD) off the PVR locally, rather than using a server-based model that uses up network capacity. The pre-positioned content could be trickled down to the hard drive at a low bit rate over a long period of time, to minimize usage of broadcast network resources.

This novel approach implies the following rules for the security management of content:

Content that the user is entitled to, via a subscription-like mechanism or after an IPPV purchase, is translated from the transport security domain 120 to the persistent security domain 130, and protected using PVR security mechanisms within the STB/IRD 110.

Content that is purchasable, but has not been explicitly purchased yet, remains in the transport security domain 120. The content is stored on the hard disk with transport security and encryption intact. Once it is explicitly purchased and decrypted, it is stored on the hard disk with PVR encryption. This approach can be used for offering IPPV and VOD off a hard drive.

This mode of operation is well-suited to satellite VOD applications, where a true interactive return path is not present. The local PVR acts as the "VOD server" for the consumer.

The creation of the persistent storage, e.g., the PVR, in the STB/IRD 110 provides a new feature. However, it is also a potential point where pirates will likely attempt to circumvent the security capability of the PVR. In one embodiment, the present invention provides a renewable security PVR. In one embodiment, renewable security is implemented through the use of a portable security card 117 that can renew the security for the PVR, e.g., providing new encryption key(s) and authentication(s) and so on. The portable security card 117 can be sent to the legitimate subscribers by the service provider for insertion into the STB/IRD 110 on a periodic basis. As such, renewable security for the PVR functionality allows security to be upgraded after products have been fielded, in order to eliminate pirate exploitation of flaws in the security used in the fielded product.

Figure 2:
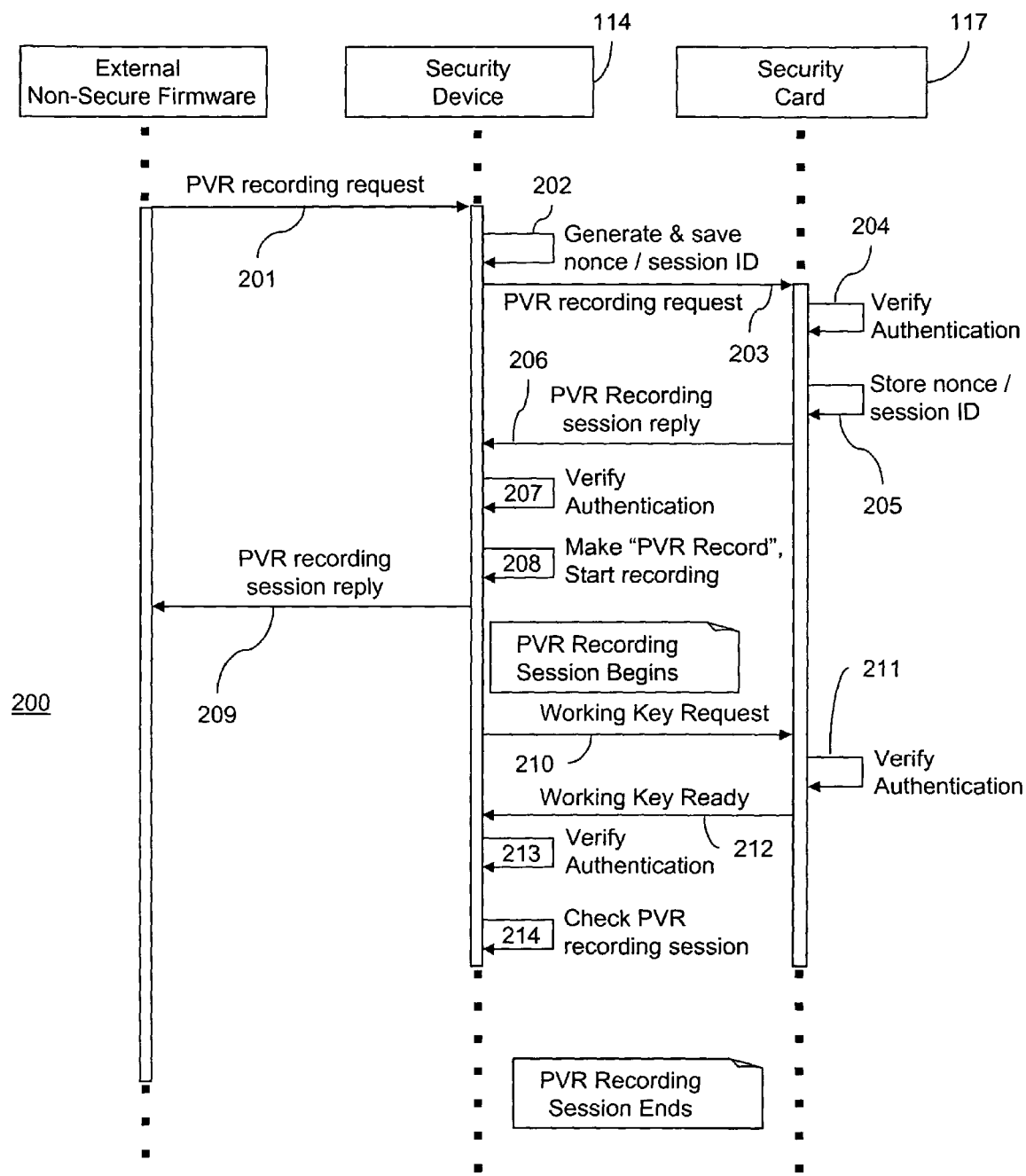
FIG. 2 illustrates a PVR recording session method in accordance with the present invention.

Namely, in one embodiment, if the optional portable security card 117 is deployed in the STD/IRD 110, then the security device 114 will operate in support mode where the portable security card 117 will perform some operations related to the PVR recording session, e.g., selection of the DRM rules and the governing of the start and stop of the PVR recording session. FIG. 2 illustrates an entire PVR recording session method 200 which shows the entire PVR recording session process from the initial PVR recording session start request to termination of the PVR recording session.

In step 201, the external non-secure firmware requests the security device 114 to start a PVR recording session. This is essentially the same request that the security device 114 will receive when it is operating in standalone mode, i.e., without the portable renewable security card 117.

In step 202, upon receiving the request to start a PVR recording session, the security device 114 shall generate a random nonce, e.g., 64-bit nonce, for use both to authenticate the request/response and to use as a PVR recording session ID. The security device 114 will store the generated nonce/session ID in volatile memory.

In step 203, the security device 114 will construct an authenticated PVR recording session request for the portable renewable security card 117, using the generated nonce/session ID.

In step 204, the portable renewable security card 117 receives the PVR recording session request, and verifies the PVR recording session request authentication using the received nonce/session ID.

In step 205, assuming the PVR recording session request authentication is valid and the PVR recording session request may be granted (program epoch authorized, DRM authorized/available, etc.), the portable renewable security card 117 then stores the nonce/session ID in volatile memory. If the PVR recording session request does not pass authentication or cannot be granted (program epoch not authorized, not authorized for selected DRM, etc.), then the portable renewable security card 117 returns an error (not shown).

In step 206, the portable renewable security card 117 constructs a PVR recording session reply containing the selected DRM rules and authenticated with the nonce/session ID.

In step 207, the security device 114 will verify the authentication of the PVR recording session reply using the stored nonce/session ID. If the PVR recording session reply does not pass authentication or contains an error the security device shall return an error to the external non-secure firmware (not shown).

In step 208, the security device 114 will create the "PVR Record" using the DRM rules received from the portable renewable security card 117 and will start the PVR recording session.

In step 209, the security device 114 will construct a PVR recording session reply (containing the "PVR Record") and return it to the external non-secure firmware, thus satisfying the original request.

At this point, the PVR recording session has been established and content is recorded. The following steps are ongoing and repeated throughout the active duration of the PVR recording session, until the portable renewable security card 117 determines that the PVR recording session is to stop.

Note that the portable renewable security card 117 may stop the PVR recording session upon request from the security device (passed through from external non-secure firmware), or may stop the PVR recording session autonomously (for instance, at the end of the program epoch). The PVR recording stop request is not shown in FIG. 2, but will be supported by the security device 114 for the portable renewable security card 117.

In step 210, the security device 114 shall generate and send an authenticated Working Key Request]. Note that a new nonce, e.g., a 64-bit nonce shall be generated for each request.

In step 211, the portable renewable security card 117 verifies the authentication for the Working Key Request.

In step 212, the portable renewable security card 117 generates and sends an authenticated Working Key Reply, but with an important difference: The reply also contains extra information to indicate to the security device 114 that the PVR recording session is currently active. The authenticator also incorporates the PVR recording session nonce/session ID.

Note that when the portable renewable security card 117 needs to stop the PVR recording session (either due to external request from security device, or autonomously), the portable renewable security card 117 indicates in the Working Key Reply that the PVR recording session is not active and removes the nonce/session ID from the computation of the authenticator. When the security device 114 detects this condition, it shall terminate the PVR recording session as described in the remaining steps.

In step 213, the security device 114 will verify the authentication of the Working Key Reply, using the nonce in the Working Key Request and (if necessary) the nonce/session ID for the PVR recording session.

Finally, in step 214, if the portable renewable security card 117 specifies that the PVR recording session must end, the security device will terminate the PVR recording session, erase the nonce/session ID, and notify the external non-secure firmware that the PVR recording session has been terminated.

Together, the above process and requirements ensures that the portable renewable security card 117 maintains ultimate control over when the PVR recording session starts and stops, so that the security device cannot be manipulated into continuing the PVR recording session beyond its limit.

Figure 3:
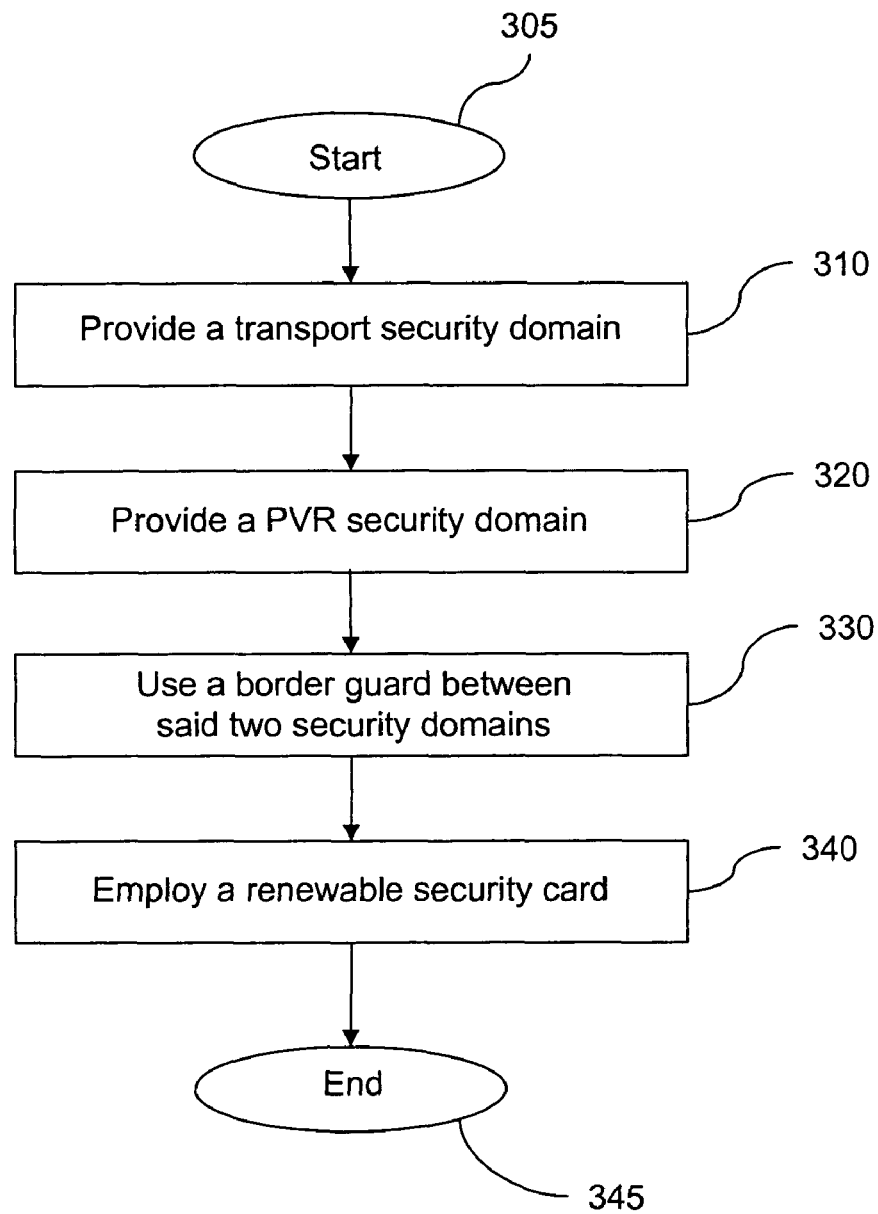
FIG. 3 illustrates a method for providing a border guard in accordance with the present invention.

FIG. 3 illustrates a method 300 for providing a border guard in accordance with the present invention. Method 300 starts in step 305 and proceeds to step 310. In step 310, a transport security domain is provided or established. For example, the delivery of a transport stream, e.g., a MPEG-2 transport or other multimedia/data (non-MPEG transport) to the STB/IRD 110, content is initially within the transport security domain 120.

In step 320, a PVR security domain is provided or established. For example, after decryption by the security device 114, e.g., the digital content moves into the PVR/DRM security domain 130, which addresses the protection of and access to the digital content inside the STB/IRD 110.

In step 330, method 300 uses a border guard, e.g., security device 114, to enforce rules for transition between the two security domains. In this manner, a content provider can defined DRM rules that will be sent with the digital content and the DRM rules will be enforced by the border guard.

In step 340, method 300 may optionally employ a portable renewable security card 117. For example, the security device 114 can be operated in a support mode, where the portable renewable security card is employed to perform some operations related to a PVR recording session. Method ends in step 345.

Figure 4:
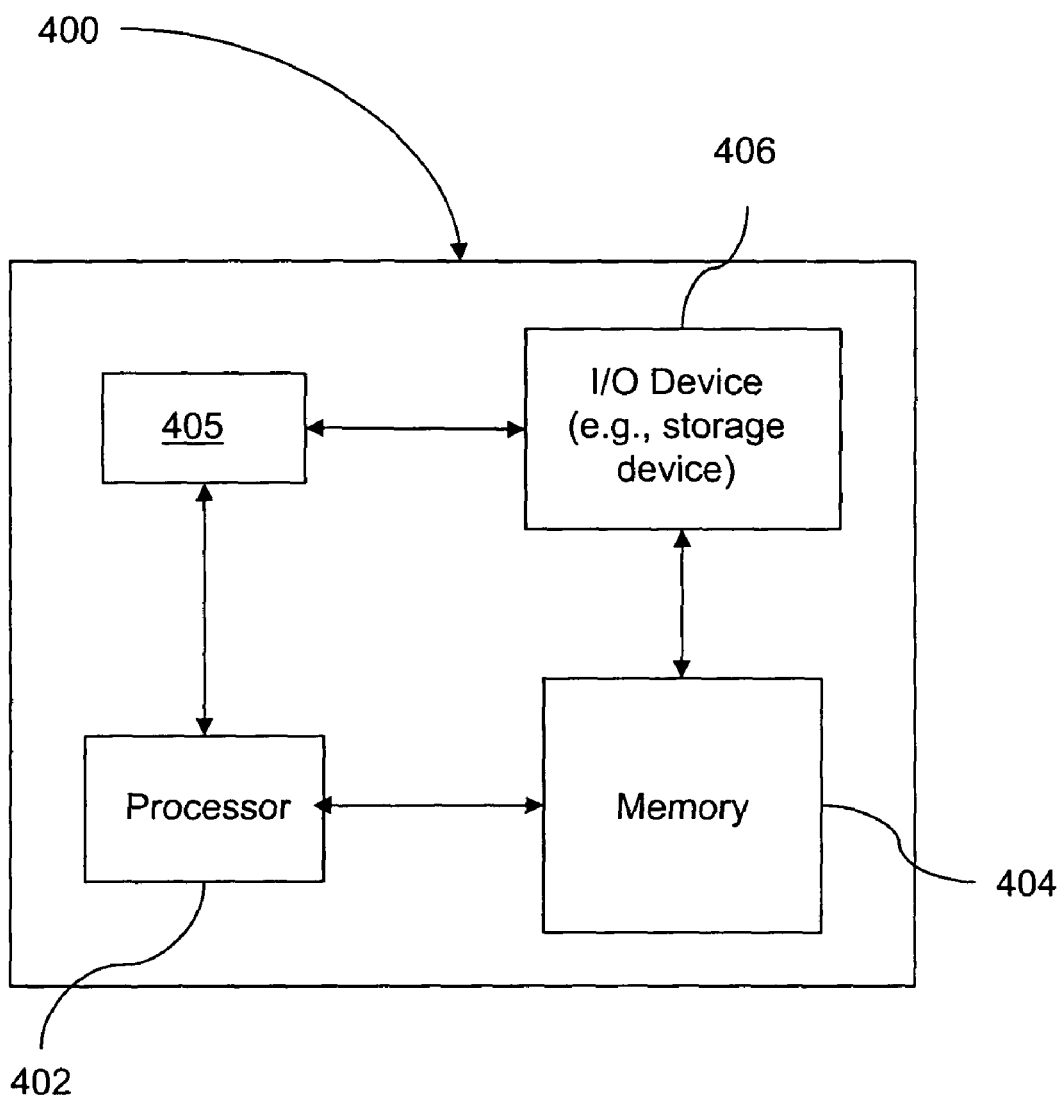
FIG. 4 illustrates the present invention implemented using a general purpose computer.

FIG. 4 is a block diagram of the present content distribution system being implemented with a general purpose computer or computing device. In one embodiment, the content distribution system is implemented using a general purpose computer or any other hardware equivalents. For example, the content distribution system 400 can be broadly implemented as a STB/IRD 110 of FIG. 1. More specifically, the content distribution system 400 comprises a processor (CPU) 402, a memory 404, e.g., random access memory (RAM) and/or read only memory (ROM), a border guard module or device 405 for implementing the methods as described above, and various input/output devices 406 (e.g., storage devices, including but not limited to, a tape drive, a floppy drive, a hard disk drive or a compact disk drive, a receiver, a decoder, a decryptor, a transmitter, a clock, a speaker, a display, an output port, a user input device (such as a keyboard, a keypad, a mouse, and the like), or a microphone for capturing speech commands).

It should be understood that the border guard module or device 405 can be implemented as a secure physical device or subsystem that is coupled to the CPU 402 through a communication channel. Alternatively, the border guard module or device 405 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 404 of the computer. As such, the border guard module or device 405 (including associated data structures and methods employed within the encoder) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for defining rules and enforcing rules of transitioning a digital content between two security domains having different security requirements, the method comprising:
   establishing a first security domain for receiving, from a digital content source, a transport stream comprising a digital content;
   establishing a second security domain associated with devices for storage of the digital content at a receiver device, wherein the second security domain is established at the border of the first security domain and the second security domain;
   wherein the digital content source can cause the digital content to be pre-positioned on the receiver device while the digital content remains in the first security domain, and the digital content source also can cause the digital content to be transmitted from the first security domain to the second security domain; and
   if the digital content source causes the digital content to be pre-positioned on the receiver device while the digital content remains in the first security domain:
      receiving and storing the digital content on the receiver device with transport security associated with the first security domain kept intact and with encryption associated with the first security domain kept intact;
   otherwise, if the digital content source causes the digital content to be transmitted from the first security domain to the second security domain:
      performing authorization for conditional access of transport stream from the first security domain;
      providing a session ID for authorizing both a program and associated digital rights management (DRM) rules received with the digital content in the first security domain, and authenticating each session request received from a particular device in the second security domain for usage of the digital content;
      selecting at least one rule from the DRM rules to be transmitted with the digital content;
      transmitting the at least one rule with the digital content from the first security domain to the second security domain;
      translating a first protection in the first security domain of the digital content and the at least one rule attached to the digital content to a second protection in the second security domain of the digital content and the at least one rule for secure delivery and locking the usage of the digital content to the particular device in the second security domain;
      continuously enforcing the at least one rule during usage of the digital content in the second security domain; and
      maintaining control over the usage of the digital content in the second security domain.

2. The method of claim 1, wherein said first security domain is a transport domain.

3. The method of claim 2, wherein said second security domain is a persistent security domain.

4. The method of claim 1, wherein said translating is performed by a border guard in the receiver device, wherein the border guard further comprises a security device, further wherein the security device comprises an application specific integrated circuit (ASIC).

5. The method of claim 4, wherein said border guard enforces said at least one rule associated with how an associated content of the digital content is moved between said first and second domains.

6. The method of claim 5, wherein said at least one rule is specified by a source of said associated content and is enforced by said border guard.

7. The method of claim 5, further comprising:
   employing a portable renewable security card, where said border guard operates cooperatively with said portable renewable security card for enforcing said at least one rule for transition between said first and second security domains.

8. A non-transitory computer-readable medium having stored thereon a plurality of instructions, the plurality of instructions including instructions which, when executed by a processor, cause the processor to perform the steps of a method for defining rules and enforcing rules of transitioning a digital content between two security domains having different security requirements, comprising:
   establishing a first security domain for receiving, from a digital content source, a transport stream comprising digital content;
   establishing a second security domain associated with devices for storage of the digital content at a receiver device, wherein the second security domain is established at the border of the first security domain;
   wherein the digital content source can cause the digital content to be pre-positioned on the receiver device while the digital content remains in the first security domain, and the digital content source also can cause the digital content to be transmitted from the first security domain to the second security domain; and
   if the digital content source causes the digital content to be pre-positioned on the receiver device while the digital content remains in the first security domain:
      receiving and storing the digital content on the receiver device with transport security associated with the first security domain kept intact and with encryption associated with the first security domain kept intact;
   otherwise, if the digital content source causes the digital content to be transmitted from the first security domain to the second security domain:
      performing authorization for conditional access of transport stream from the first security domain;
      providing a session ID for authorizing both a program and associated digital rights management (DRM) rules received with the digital content in the first security domain, and authenticating each session request received from a particular device in the second security domain for usage of the digital content;
      selecting at least one rule from the DRM rules to be transmitted with the digital content;
      transmitting the at least one rule with the digital content from the first security domain to the second security domain;
      translating a first protection in the first security domain of the digital content and the at least one rule attached to the digital content to a second protection in the second security domain of the digital content and the at least one rule for secure delivery and locking the usage of the digital content to the particular device in the second security domain;

continuously enforcing the at least one rule during usage of the digital content in the second security domain; and maintaining control over the usage of the digital content in the second security domain.

9. The computer-readable medium of claim 8, wherein said first security domain is a transport domain.

10. The computer-readable medium of claim 9, wherein said second security domain is a persistent security domain.

11. The computer-readable medium of claim 8, wherein said translating is performed by a border guard in the receiver device, wherein the border guard further comprises a security device, further wherein the security device is an application specific integrated circuit (ASIC).

12. The computer-readable medium of claim 11, wherein said border guard enforces said at least one rule associated with how an associated content of the digital content is moved between said first and second domains.

13. The computer-readable medium of claim 12, wherein said at least one rule is specified by a source of said associated content.

14. The computer-readable medium of claim 8, further comprising:

employing a portable renewable security card, where a border guard operates cooperatively with said portable renewable security card for enforcing said at least one rule for transition between said first and second security domains.

15. A receiver device comprising a security device, the security device in a standalone mode defining and enforcing rules of transitioning a digital content between two security domains having different security requirements, the security device comprising:

means for establishing a first security domain for receiving, from a digital content source, a transport stream comprising digital content; and means for establishing a second security domain associated with devices for storage and usage of the digital content at a receiver device;

wherein the digital content source can cause the digital content to be pre-positioned on the receiver device while the digital content remains in the first security domain, and the digital content source also can cause the digital content to be transmitted from the first security domain to the second security domain;

the receiver device further comprising:

means for receiving and storing, if the digital content source causes the digital content to be pre-positioned on the receiver device while the digital content remains in the first security domain, the digital content on the receiver device with transport security associated with the first security domain kept intact and with encryption associated with the first security domain kept intact; and the security device further comprising:

means for performing, if the digital content source causes the digital content to be transmitted from the first security domain to the second security domain, authorization for conditional access of transport stream from the first security domain;

means for providing, if the digital content source causes the digital content to be transmitted from the first security domain to the second security domain, a session ID for authorizing both a program and associated digital rights management (DRM) rules received with the digital content in the first security domain, and authenticating each session request received from a particular device in the second security domain for usage of the digital content;

means for selecting, if the digital content source causes the digital content to be transmitted from the first security domain to the second security domain, at least one rule from the DRM rules to be transmitted with the digital content;

means for transmitting, if the digital content source causes the digital content to be transmitted from the first security domain to the second security domain, the at least one rule with the digital content from the first security domain to the second security domain;

means for translating, if the digital content source causes the digital content to be transmitted from the first security domain to the second security domain, a first protection in the first security domain of the digital content and the at least one rule attached to the digital content to a second protection in the second security domain of the digital content and the at least one rule for secure delivery and locking the usage of the digital content to the particular device in the second security domain;

means for continuously enforcing, if the digital content source causes the digital content to be transmitted from the first security domain to the second security domain, the at least one rule during usage of the digital content in the second security domain; and means for maintaining control, if the digital content source causes the digital content to be transmitted from the first security domain to the second security domain, over the usage of the digital content in the second security domain.

\* \* \* \* \*